(12) United States Patent
Skalli et al.

(10) Patent No.: US 8,744,826 B2
(45) Date of Patent: Jun. 3, 2014

(54) METHOD FOR SIMULATING THE BEHAVIOR OF AN ARTICULATED SET OF BONES

(75) Inventors: Wafa Skalli, Paris (FR); Yoann Lafon, Albi (FR); Virginie Lafage, Lafrancaise (FR); Jean-Paul Steib, Strasbourg (FR); Jean Dubousset, Paris (FR); François Lavaste, Saint-Michel-sur-Orge (FR)

(73) Assignees: Ecole Nationale Superieure d'Arts et Metiers, Paris (FR); Centre National de la Recherche Scientifique, Paris (FR)

( * ) Notice: Subject to any disclaimer, the term of this patent is extended or adjusted under 35 U.S.C. 154(b) by 486 days.

(21) Appl. No.: 12/517,772

(22) PCT Filed: Dec. 4, 2007

(86) PCT No.: PCT/FR2007/001982
§ 371 (c)(1),
(2), (4) Date: Jun. 4, 2009

(87) PCT Pub. No.: WO2008/081105
PCT Pub. Date: Jul. 10, 2008

(65) Prior Publication Data
US 2010/0145663 A1    Jun. 10, 2010

(30) Foreign Application Priority Data
Dec. 7, 2006 (FR) .................. 06 10671

(51) Int. Cl.
*G06G 7/58* (2006.01)

(52) U.S. Cl.
USPC .......... 703/11; 703/6; 600/425; 600/300; 600/595

(58) Field of Classification Search
USPC ............................ 703/7, 11; 600/595
See application file for complete search history.

(56) References Cited

U.S. PATENT DOCUMENTS

| | | | |
|---|---|---|---|
| 6,205,411 B1 * | 3/2001 | DiGioia et al. | 703/11 |
| 7,046,830 B2 * | 5/2006 | Gerard et al. | 382/128 |
| 7,391,846 B2 * | 6/2008 | Verdonck et al. | 378/62 |
| 2004/0254771 A1 * | 12/2004 | Riener et al. | 703/7 |
| 2006/0120583 A1 * | 6/2006 | Dewaele | 382/128 |
| 2007/0066917 A1 * | 3/2007 | Hodorek et al. | 600/595 |
| 2007/0093998 A1 * | 4/2007 | El-Baroudi | 703/11 |

FOREIGN PATENT DOCUMENTS

WO    WO-2004/061721    7/2004

OTHER PUBLICATIONS

Edwards et al. Selective Thoracic Fusion for Adolescent Idiopathic Scoliosis With C Modifier Lumber Curves: 2- to 16-Year Radiograhphic and Clinical Results Spine. 2004; 29(5), Lippincott Williams & Wilkins.*
Stokes et al. Three-Dimensional Simulation of the Scoliosis Derotation Maneuveur with Cotrel-Dubousset Instrumentation J. Biomechanics vol. 27, pp. 177-181, 1994.*
Lafage et al, "Finite element simulation of various strategies for CD correction," Studies in Health Technology and Informatics, 2002, pp. 428-432, vol. 91, IOS Press, Amsterdam NL.
Aubin et al., :"Geometrical modeling of the spine and the thorax for the biomechanical analysis of scoliotic deformities using the finite element method modelisation," Annales de Chirurgie, 1995, pp. 749-761, vol. 49, Paris.
Perie et al.,: "Personalized biomechanical modeling of Boston brace treatment in idiopathic scoliosis," Studies in Health Technology and Informatics, 2002, pp. 393-396, vol. 91.
Lavaste et al.,:"Three-dimensional geometrical and mechanical modeling of the lumbar spine" Journal of Biomechanics, Oct. 1992, pp. 1153-1164, vol. 25—No. 10.
Lafage et al., "3D finite element simulation of Cotrel-Dubousset correction," Computer Aided Surgery: Official Journal of the International Society for Computer Aided Surgery, 2004, pp. 17-25, vol. 9—No. 1-2.

* cited by examiner

*Primary Examiner* — Omar Fernandez Rivas
*Assistant Examiner* — Cuong Luu
(74) *Attorney, Agent, or Firm* — Muncy, Geissler, Olds & Lowe, P.C.

(57) ABSTRACT

A method of simulating the behavior of an articulated set of bone parts, in particular the vertebral column comprising a construction step of constructing a three-dimensional geometrical model from data that is specific to the subject in a reference position; and a mechanical customization step of determining the geometrical model by detailing at least some of the connection areas of the bone parts. The mechanical customization step includes a stage of customizing critical connection areas for the bone parts; a data acquisition stage of acquiring data concerning the articulated bone set of the subject during at least one clinical test of posture; and a characterization stage for characterizing the mechanical parameters of said junction areas in order to cause the model to reproduce the data acquired during the above-mentioned clinical test.

9 Claims, No Drawings

METHOD FOR SIMULATING THE BEHAVIOR OF AN ARTICULATED SET OF BONES

The present invention relates to a method of simulating the behavior of an articulated set of bones, e.g. such as the vertebral column of a subject, when the set is subjected to stresses resulting from corrective, plastic, or prosthetic surgery.

Computer-assisted surgery, in particular for orthopedics, includes a first step: that of modeling the part of the subject that is to be operated on. For assisting the surgical act, the modeling is limited to a three-dimensional geometrical representation for guiding (routing) the prosthesis-placing instruments.

For more advanced assistance providing the surgeon with help in making decisions regarding the operating strategy to be adopted, the modeling of the set of bones must be much more complete, and in particular it must include data representing the mechanical behavior of the set so that the model lends itself to simulation of its behavior. The modeling, usually implementing digitizing by finite elements, needs to represent the unique characteristics of each subject as accurately as possible.

It is also advisable to model the implant or prosthesis for use in association with the anatomical model of the subject. This modeling is much simpler. This association of models results in an overall digital model that depends on the type of implant and on the operating strategy selected by the surgeon. Displacing the implant model relative to the customized digital model of the subject results in a new shape made up of the two models combined. In other words, the association may be no more than a system of forces interacting on the model of the implant and on the model of the subject's bone set.

By varying the parameters of this association of two digital models, one or more aspects of the subject's behavior can be simulated as a function of the operating strategy choices made by the surgeon.

BACKGROUND OF THE INVENTION

Document WO 2004/061721 shows prior art in the field of the invention. That document describes the creation of a digital model of a patient, that is customized both in geometrical terms and in mechanical terms, for subsequent use in a method of simulating operating strategy, so that prior to an operation, the predictable result can be visualized, thus giving the surgeon the means to assess the effects of a surgical act on the final equilibrium of the patient and on the internal stresses both in the implant and in the anatomical structures.

In the step of constructing the model of the subject, there exists a stage of creating a three-dimensional model as a function of calibrated radiographs of the subject, i.e. radiographs compared with a known point of reference, or a tomographic image of the subject, or any other datum suitable for three-dimensionally reconstituting a customized set of bones. This stage is finished by allocating various general mechanical characteristics to the geometrical reconstitution, which characteristics result from known models forming a kind of standard database applicable to all reconstructed geometries.

The above-mentioned document proposes a method of customizing the mechanical characteristics of the model that is already geometrically customized.

Based on a series of clinical tests carried out on the patient by the surgeon, real geometries are acquired (e.g. by radiography) and the observed displacements relative to a normal posture are interpreted to deduce therefrom mathematical functions governing the behavior of the joint spaces (intervertebral bodies) that satisfy the acquired geometries and do so for each connection between two adjacent vertebrae. That method of proceeding quickly comes up against computation blocks or unsolvable situations because for a vertebral column, there are 17 successive connections between pairs of vertebral bodies to be treated.

OBJECT OF THE INVENTION

The present invention seeks to propose an alternative solution that is much more effective, requiring only limited computation capacity and time in order to customize a digital model of the spine, thereby lending itself, most advantageously, to pre- or post-operative simulation of a surgical act or strategy.

DETAILED DESCRIPTION OF THE INVENTION

To this end, the invention provides a method of simulating the behavior of an articulated set of bone parts, in particular the vertebral column of a subject, the method comprising:
  a construction step of constructing a three-dimensional geometrical model of the set from data that is specific to the subject in a reference position; and
  a mechanical customization step of customizing the geometrical model by detailing at least some of the articulated connection areas of the bone parts, in which method the mechanical customization step includes:
    a customization stage of customizing critical connection areas for the bone parts, referred to as junction areas;
    a data acquisition stage of acquiring data concerning the articulated bone set of the subject during at least one clinical test of posture in a position different from the reference position or a clinical test of movement starting from said reference position; and
    a characterization stage of characterizing the mechanical parameters of said junction areas in order to cause the model to reproduce the data acquired during the above-mentioned clinical test.

Said data may be a form, comprising movement parameters (trajectory, velocity, etc.), optionally accompanied by measuring forces and/or stresses.

One of the important characteristics of the invention lies in this stage of determining critical connection areas of the bone parts of the joint in question, in other words junction areas. These junction areas are determined by means of an algorithm drawn from the clinical expertise of surgeons. For example, in the case of scoliosis, these critical areas are located by detecting specific parameters in the relative adjacent positioning of two vertebrae. Thus, every effort is made to locate any discontinuity, either in the rotation of a vertebra relative to the adjacent vertebra, or in its inclination when the spine is looked at from the front. The construction of the three-dimensional geometrical model is a known step and several methods allow a satisfactory result to be obtained, and this either from orthogonal radiographs of a subject, or from tomographic data of the subject. It should also be stated that the most common clinical test, known as bending, consists in forcing a sideways inclination of the subject to the left and to the right in order to recover the shape of the spine in these two inclinations.

Once the customized digital model has been constructed in this way, the simulation method of the invention consists either in subjecting the model to a set of forces representing the action of an implant, or in combining the model in functional manner with an implant model as a function of insertion strategy, in order to calculate the shape of the digital model that results therefrom and in order to represent it graphically.

The set of forces or the functional association should be representative of the operating strategy adopted. By way of example, there are several types of prosthesis suitable for being associated with a vertebral column of a subject, in particular to correct scoliosis.

One surgery known by the name Cotrel-Dubousset consists in fastening a rod to certain strategic vertebrae of the vertebral column, in particular the vertebrae in the junction areas and the most poorly aligned vertebra (the apex of the deformation), which rod possesses curvature that is different from that of the prepared column, generally curvature that is less pronounced, and constituting an approximate indication of the curvature that it is desired to impose on the column in the end. In this method, once the rod has been fastened along the spine in sorts of bearings that allow the rod to turn about its axis, it can be turned through 90°, firstly in order to compel the spine to lie substantially in the sagittal plane, and secondly in order to follow the curve of the rod in the frontal plane. This manipulation causes the vertebrae to move, which movements of the vertebrae include components in rotation. The surgery is then followed by fitting a second rod of curvature specifically for correcting the rotations induced by the first operating stage.

On the computer system for implementing the method of the invention, the surgeon's choices give rise to forces being applied automatically on areas pre-established by the program implementing the method, or by giving the surgeon the responsibility of choosing and determining which rod is to be used from a library of rods and vertebrae affected by the attachment of the rod to the column.

The method of the invention applies also when another operating strategy is decided on, such as in situ bending of the rod. This method consists in connecting each vertebra of the spine to a horizontal rod and then proceeding to bend the rod in the frontal plane and in the sagittal plane by means of suitable forceps. As mentioned above, the surgeon chooses either an automatic program for correcting the customized model made by the program for implementing the method of the invention, the correction being based on calculation steps themselves developed while taking into account the expertise of certain practitioners of the method, and the surgeon is given a choice of rod (concerning its strength, its length, and various deformations and sequences of deformations that the surgeon may perform on the rod), or else the surgeon is simply suggested the sequence of successive bends to be made along the rod. In the same way as above, this action on the rod connected to the column results in the application of forces that act on the digital model and lead to it being deformed until the shape desired by the surgeon has been reached.

The method of the invention thus allows the surgery to be simulated before the operation in a manner that depends on the adopted strategy, the simulation varying depending on the choices made by the surgeon, said surgeon then being in the presence of a plurality of results, making it possible to adopt the surgical operation to be applied, given the simulated results as observed and selected by the surgeon.

In a more refined variant of the method of the invention for simulating the results of an operating strategy, prior to the actual simulation of the surgery, one stage consists in applying to the customized digital model, which other set of static forces that represents supporting the subject during surgery.

By way of example, it consists in simulating the effect of the operating table on the subject, if for example said subject is lying on his front on the table, the fixed points being, as concerns the vertebral column, the pelvis and the thoracic cage, even if in reality said cage acts like a spring. The forces are selected as a function of the personal data of the subject, which data may include subject's weight, height, and the locations of different centers of mass, if they are known. The operation using the selected operation strategy is therefore simulated on the digital model that has already been modified in shape by the first field of static forces and the final result is simulated by removing said field of forces in order to assess the result when the subject is in an upright position.

It is stated that one important advantage of the method of the invention, stemming from the procedure for customizing the digital model, enables customization to be performed quickly, where implementing such customization does indeed correspond to a clinical approach to the anatomical disorder to be corrected.

The above description serves primarily to illustrate the method of the invention as applied to corrective spinal surgery. The method is not however limited to such surgery. It also relates to other complex joints such as the knee or the shoulder. In such applications, where it is necessary to characterize the behavior of a set of ligaments and of other connecting elements organized in a complex manner, the critical areas of these joints are determined from the expertise of specialized surgeons, which is translated in form of a program for determining them by examining the customized model of the joint as a function of specific criteria retained by the clinicians. The clinical test(s) taken into account in the method are also specific to the joint concerned and are closely associated with the experience of practitioners. For the knee for example, they are tests aiming to assess the laxities of ligaments.

The invention claimed is:

1. A method of simulating the behavior of an articulated set of vertebrae of a spine, with limited computational capacity and time, comprising:
   a construction step of constructing a three-dimensional geometrical model, in a computer, of the set from data that is specific to the subject in a reference position; and
   a mechanical customization step of customizing the geometrical model comprising:
      a stage of determining critical connection areas in the vertebrae set, by determining for every connection area the rotation and/or inclination of the adjacent vertebrae which are connected by this connection area;
      concluding that every connection for which said rotation and/or inclination is singular are critical connection areas based on predetermined specific criteria;
      concluding that every connection area for which said rotation and/or inclination is normal are not critical connection areas;
   a data acquisition stage of acquiring data concerning the articulated vertebrae set of the subject during at least one clinical test of posture in a position different from the reference position or a clinical test of movement starting from said reference position; and
   a stage of determination for the mechanical parameters of said critical connection areas in order to cause the model to reproduce the shape acquired by the above-mentioned set of vertebrae during the clinical test.

2. A method according to claim 1, wherein it consists either in subjecting the model to a set of forces representing the action of an implant, or in combining the model in functional manner with an implant model depending on insertion strategy, in order to calculate the shape of the digital model that results therefrom and in order to represent it graphically.

3. A method according to claim 2, wherein it consists in applying another set of static forces to the customized digital model, which other set of static forces represents supporting the subject during surgery and in removing said other set of static forces before representing the final result graphically.

4. A method according to claim 2, wherein the set of forces belong to a database from Which they are extracted depending on the surgical method adopted and in said method, on the final operating strategy.

5. A method according to claim 4, wherein the surgical method adopted is the method known by the name Cotrel-Dubousset.

6. A method according to claim 4, wherein the method adopted is the in situ bending of the rod.

7. A method according to claim 3, wherein the set of forces belong to a database from which they are extracted depending on the surgical method adopted and in said method, on the final operating strategy.

8. A method according to claim 7, wherein the surgical method adopted is the method known by the name Cotrel-Dubousset.

9. A method according to claim 7, wherein the method adopted is the in situ bending of the rod.

\* \* \* \* \*